(12) United States Patent
Kisieliński

(10) Patent No.: US 11,123,947 B2
(45) Date of Patent: Sep. 21, 2021

(54) MULTILAYER PIPE AND POLYETHYLENE TUBE CONTAINING A MULTILAYER PIPE

(71) Applicant: WITOPLAST KISIELIŃSCY SPÓŁKA JAWNA, Rudno (PL)

(72) Inventor: Michal Kisieliński, Warsaw (PL)

(73) Assignee: WITOPLAST KISIELIŃSCY SPÓŁKA JAWNA

( * ) Notice: Subject to any disclaimer, the term of this patent is extended or adjusted under 35 U.S.C. 154(b) by 0 days.

(21) Appl. No.: 17/265,574

(22) PCT Filed: Aug. 1, 2019

(86) PCT No.: PCT/IB2019/056572
§ 371 (c)(1),
(2) Date: Feb. 3, 2021

(87) PCT Pub. No.: WO2020/026190
PCT Pub. Date: Feb. 6, 2020

(65) Prior Publication Data
US 2021/0237391 A1    Aug. 5, 2021

(30) Foreign Application Priority Data
Aug. 3, 2018   (PL) ...................................... PL426552

(51) Int. Cl.
*B32B 1/08*   (2006.01)
*B32B 27/32*  (2006.01)
(Continued)

(52) U.S. Cl.
CPC .................. *B32B 1/08* (2013.01); *B32B 7/12* (2013.01); *B32B 27/08* (2013.01); *B32B 27/18* (2013.01);
(Continued)

(58) Field of Classification Search
CPC ........... B32B 1/08; B32B 27/32; B32B 27/08; B32B 7/12; B32B 27/18; B32B 27/306;
(Continued)

(56) References Cited

U.S. PATENT DOCUMENTS

| 2014/0186561 A1 | 7/2014 | Bhattacharya et al. |
| 2015/0158278 A1 | 6/2015 | Banerjee |

(Continued)

FOREIGN PATENT DOCUMENTS

| EP | 2 776 246 | 9/2014 |
| WO | 2018/061028 | 4/2018 |

OTHER PUBLICATIONS

The International Search Report (ISR) with Written Opinion for PCT/IB2019/056572 dated Oct. 18, 2019, pp. 1-10.

*Primary Examiner* — Michael C Miggins
(74) *Attorney, Agent, or Firm* — McDonnell Boehnen Hulbert & Berghoff LLP

(57) ABSTRACT

The subject of the invention is a multilayer pipe consisting of layers in a structure: the first layer, which is polyethylene LDPE or a combination of 80% polyethylene LDPE and 20% polyethylene HOPE; the second layer, which is a combination: 50-70% LDPE polyethylene or a combination of 80% LDPE polyethylene and 20% HOPE polyethylene with 30-50% recycled polyethylene granulate; a third layer which is the binding layer; a fourth layer which is the barrier layer of EVOH; the fifth layer, which is the binding layer; the sixth layer, which is made of LDPE polyethylene or a combination of 80% LDPE polyethylene and 20% HOPE polyethylene, characterized in that the first layer contains dispersed particles of zinc oxide in the amount of $5 \times 10^2$ to $1 \times 10^4$ ppm.

6 Claims, 1 Drawing Sheet

(51) Int. Cl.
 *B32B 27/08* (2006.01)
 *B32B 7/12* (2006.01)
 *B32B 27/18* (2006.01)
 *B32B 27/30* (2006.01)

(52) U.S. Cl.
 CPC ............ *B32B 27/306* (2013.01); *B32B 27/32* (2013.01); *B32B 2250/05* (2013.01); *B32B 2250/24* (2013.01); *B32B 2307/7244* (2013.01); *B32B 2307/73* (2013.01); *B32B 2439/00* (2013.01)

(58) Field of Classification Search
 CPC ............ B32B 2439/00; B32B 2250/05; B32B 2250/24; B32B 2307/7244; B32B 2307/73
 See application file for complete search history.

(56) References Cited

U.S. PATENT DOCUMENTS

2017/0145188 A1  5/2017  Willems et al.
2018/0134013 A1  5/2018  Arena et al.

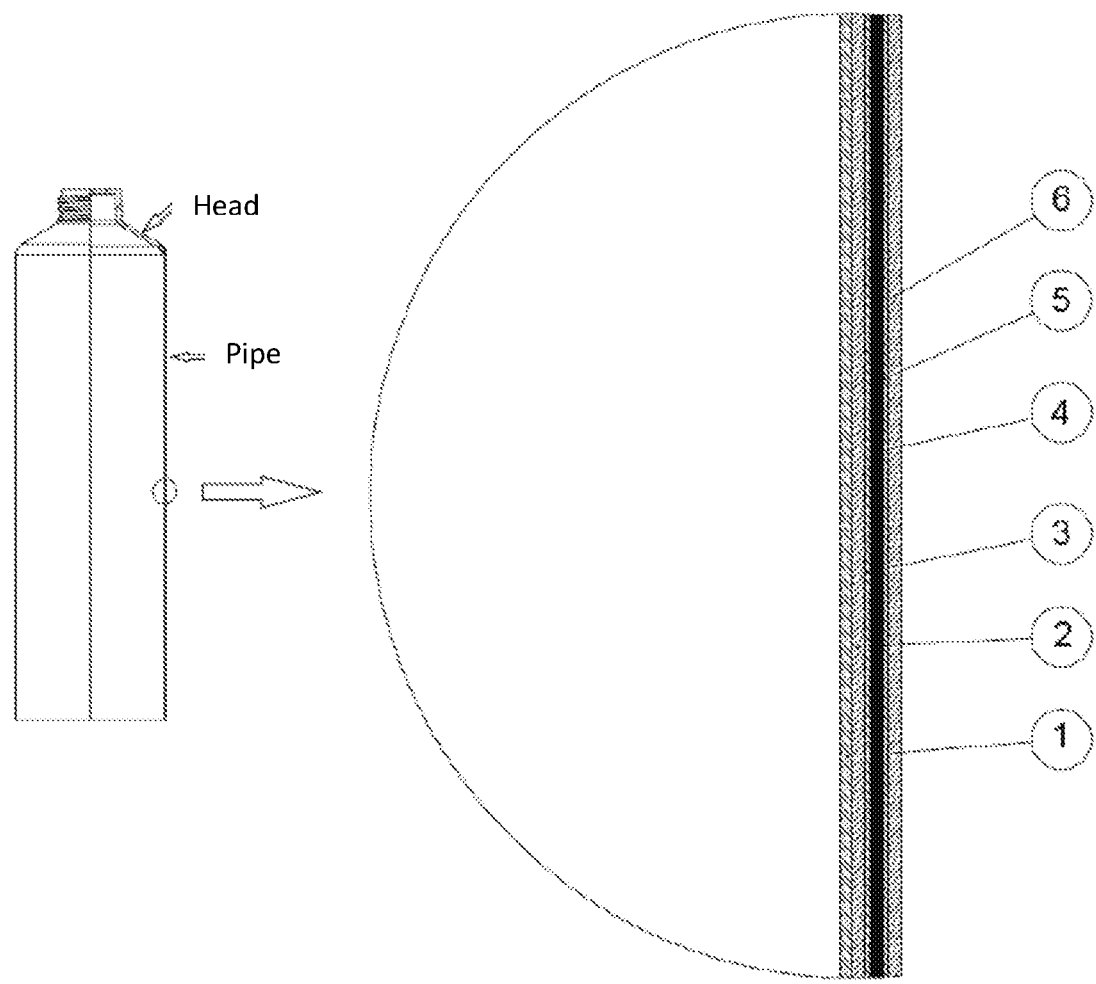

MULTILAYER PIPE AND POLYETHYLENE TUBE CONTAINING A MULTILAYER PIPE

CROSS REFERENCE TO RELATED APPLICATION

This application is a U.S. national phase of International Application No. PCT/IB2019/056572, filed on Aug. 1, 2019, which claims priority to Poland Patent Application No. PL426552, filed Aug. 3, 2018, both of which are incorporated by reference herein in their entirety.

The subject of the invention is a multilayer pipe with barrier and anti-adhesive properties and a polyethylene tube containing a multilayer pipe intended for the storage of cosmetic preparations.

The state of the art provides solutions of multilayer containers or laminates for forming packaging containers that have barrier properties or include the addition of coloring agents, such as zinc oxide.

The solution in the form of a multilayer barrier film and a laminate containing the above barrier film is known from application EP2776246. The document also discloses the method of manufacturing the laminate containing the multilayer barrier film and the product obtained by this method.

The above solution uses a multilayer barrier film consisting of a polyamide layer placed between the layers of ethylene vinyl alcohol (EVOH), which may be additionally doped with polyamide, and the polyamide layer may be enriched with a coloring agent, which may be titanium dioxide (TiO2), zinc oxide (ZnO) or calcium carbonate (CaCO$_3$). The barrier film is placed in contact with the layers of polyethylene film.

The laminate containing a multilayer barrier film can be used to produce tubes characterized by good UV resistance properties and barrier properties against gases or aromatic substances.

Furthermore, the solution known from the application WO2018061028 concerns a multilayer flexible laminated tube containing a multilayer barrier film for uses where relatively high bending capacity and limited elasticity are required. The laminate consists of a multilayer printable film, two aluminum layers acting as a barrier film, arranged between binder layers and a multilayer sealing film.

None of the solutions known from the state of the art, however, provided for a polyethylene tube, which, apart from its barrier properties, would also have anti-adhesive properties resulting from the properties of zinc oxide.

A component in the form of zinc oxide was added to the laminate forming packaging containers, but as a barrier against UV radiation, or as a colorant of the packaging layer.

It was unexpectedly found that the doping of polyethylene with a zinc oxide component in a certain quantity and the use of this layer as the inner layer of the tube in direct contact with the product inside it gave unexpected hydrophobic properties. The hydrophobic and anti-adhesive results obtained ensure better and easier emptying of the tube from its contents.

The hydrophobic properties of surfaces modified with different forms of zinc oxide are described in the documents Meiling Zhang et al. "*Lubricant-infused casing by double-layer ZnO on aluminium and its anti-corrosion performance*" *Journal of Alloys and Compounds* 764; 2018; 730-737 and Sukanta P. et al, "*In situ generation and deposition of ZnO nanoparticles on cotton surface to impart hydrophobicity: investigation of antibacterial activity Materials Technology;* 33; 2018; 555-562. The first of the above mentioned documents discusses the water repellent properties of zinc oxide films synthesized by a combination of two methods, sol-gel and hydrothermal. Aluminium substrate was covered with ZnO layer obtained by sol-gel method and then with ZnO layer obtained by hydrothermal method. The coating obtained by this method showed strong hydrophobic, oleophobic and even anti-adhesive properties for food products such as juices and jams. The studies also confirmed good anti-fouling properties of aluminium surfaces modified with zinc oxide layers.

The latter publication concerns the coating of cotton surfaces with a layer of zinc oxide nanoparticles stabilized with fluorosurfactant, which allows to obtain surfaces with hydrophobic and antibacterial properties, while maintaining moderate cytotoxicity. Hydrophobicity tests based on the measurement of water drop wetting resistance of the tested surfaces (WDR test) and the measurement of the (wettability contact angle (WCA) show that the cotton substrate covered with a layer of nanoparticles of zinc oxide shows significant any-adhesive properties for water described by the WCA (wettability contact angle) index at the level of 124.35°.

Another work from this year (Anthonysamy Arputharaj, Vigneshwaran Nadanathangam & Sanjeev R. Shukla (2018): Development of multi-functional cotton surface for sportswear using nano zinc oxide, Journal of Natural Fibers, DOI: 10.1080/15440478.2018.1492490) confirmed the possibility of using zinc oxide to create hydrophobic clothing surfaces for athletes.

The effectiveness of ZnO as a hydrophobic compound was also confirmed in M. Faraz, M. Z. Ansari, N. Khare, Synthesis of nanostructure manganese doped zinc oxide/polystyrene thin films with excellent stability, transparency and super-hydrophobicity, Materials Chemistry and Physics (2018), doi: 10.1016/j.matchemphys.2018.02.011. The physico-chemical properties of the ZnO/water interfacial connections cause that the thin film of ZnO can be either hydrophilic or hydrophobic. The paper discusses the results of studies on wettability of a film from a polystyrene composite (PS) containing zinc oxide (ZnO—PS) and additionally containing manganese (Mn/ZnO—PS) using the hydrothermal method. The wettability data of the surfaces obtained in this way indicate a very favorable hydrophobicity of the two obtained layers at the studied level of the WCA values: 107° for film (ZnO—PS) and 151° for film (Mn/ZnO—PS).

The properties of reduced water absorption by cellulose surfaces modified with nano-particles of zinc oxide are known from the article Ahmohammadi Fereshteh., & Almasi, Hadi., "*Morphological, physical, antimicrobial and release properties of ZnO nanoparticles-loaded bacterial cellulose films, Carbohydrate Polymers*", *Carbohydrate Polymers;* 149; 2016; 8-19.

In this publication, the method of preparation of bacterial cellulose monolayer and multilayer film, containing 5% by weight of ZnO nanoparticles were revealed. Thanks to the addition of zinc oxide, the material gained even more than 22% lower water absorption.

Until now, antiadhesive properties in containers were attributed to polymers used in their production, e.g. self-cleaning properties are attributed to Teflon. This so-called lotus effect is obtained in the state of the art by, for example, treating casings with fluorochemical agents or silicone. Often used additives are harmful to human health and cannot be added to products in contact with cosmetic preparations. Moreover, such additives are not universal and must be carefully matched to the type of material according to its intended use. Therefore, there is a constant demand for the search for new additives ensuring the anti-adhesive effect suitable for use in specific materials for the manufacture of e.g. packaging.

There is also still a need for a greater variety of packages, especially those that provide barrier protection against gases and liquids for cosmetic products placed inside, as well as for easy and complete emptying of the package from its contents. Until now, this type of six-layer polymer tube, which combines barrier and anti-adhesive properties, has not been known in the cosmetic industry.

The aim of the invention is to develop a polyethylene tube that would provide an anti-adhesive properties to the product in the tube, while at the same time providing barrier properties to protect the substance inside the tube.

The subject of the invention is a multilayer pipe consisting of layers in a structure:
  a) first layer consisting of LDPE polyethylene or a combination of 80% LDPE polyethylene and 20% HDPE polyethylene
  b) second layer, which is a mixture of: 50-70% LDPE polyethylene or a combination of 80% LDPE polyethylene and 20% HDPE polyethylene with the addition of 30-50% recycled polyethylene granulate
  c) third layer, which is the binding layer
  d) fourth layer, which is the barrier layer of EVOH
  e) fifth layer, which is the binding layer
  f) sixth layer, consisting of LDPE polyethylene or a combination of 80% LDPE polyethylene and 20% HDPE polyethylene,
  characterized in that the first layer, consisting of LDPE polyethylene, contains dispersed particles of zinc oxide in the range from $5 \times 10^2$ to $1 \times 10^4$ ppm.

Preferably, the multilayer pipe is characterized in that the binding layers are adhesives selected from the group: cyanoacrylate adhesives, methacrylate adhesives, epoxy adhesives or polyurethane adhesives.

Preferably, the amount of dispersed zinc oxide particles in the first layer of the first multilayer pipe is $3 \times 10^3$ ppm.

Preferably, a multilayer pipe is characterized in that the first layer is 10-50 μm thick, the second layer is 150-205 μm thick, the third layer is 10-20 μm thick, the fourth layer is 9-30 μm thick, the fifth layer is 10-20 μm thick, the sixth layer is 150-205 μm thick.

The subject of the invention is also a polyethylene tube consisting of a multilayer pipe defined above, closed by means of hot sealing at one side to form the bottom of the tube and connected at the opposite side to the bottom of the tube by a threaded head, wherein the first layer of the multilayer pipe, which is made of LDPE polyethylene or a combination of 80% LDPE polyethylene and 20% HDPE polyethylene, contains dispersed particles of zinc oxide in the amount from $5 \times 10^2$ to $1 \times 10^4$ ppm and is the inner layer of the tube that comes into contact with the product inside the container. Preferably, the multilayer pipe of the polyethylene tube has a diameter of 35 mm and a coating thickness of 500 μm.

By using six layers in the production of a multilayer pipe, it was possible to obtain a tube that allows easy and complete emptying of its contents, as well as preventing the leakage (evaporation) of valuable ingredients contained in the preparation and preventing the processes of penetration of external factors into the tube and interaction with the preparation, such as the penetration of moisture or oxygen, which adversely affect the components of cosmetic preparations. The six-layer structure of the pipe and the polymer materials used ensure the tube's flexibility and easy deformation during emptying.

For the purpose of this description, the pipe and further the tube according to the invention, two layers of which are made of a thermoplastic material such as polyethylene, is defined as a polyethylene pipe and a polyethylene tube respectively.

Thermoplastic materials suitable for forming thermoplastic layers of pipes according to the invention (first, second and sixth layer), and consequently the tube, are polymeric materials such as various types of polyethylene, including selected from the group: low density polyethylene LDPE, a mixture of high density polyethylene HDPE with LDPE, preferably 80% HDPE and 20% LDPE, as well as a combination of polyethylene with its any copolymer.

The second layer of polyethylene consists of 30-50% of plastic obtained from production waste in the post-consumer recycling process PCR (regranulate) and beneficially 50-70% of polyethylene LDPE or a combination of 80% polyethylene HDPE and 20% polyethylene LDPE.

The materials suitable for the formation of the barrier layer (third layer) used in the formation of a multilayer pipe are plastics, such as EVOH (ethylvinyl alcohol copolymer resin). Good results are obtained with a barrier layer from 0.1 to 50% by weight of EVOH compared to a polyethylene thermoplastic layer. Such a solution enables good bonding of thermoplastic and barrier layers. The barrier layer is preferably a commercially available material under the name MITSUI EVAL LCF101B.

The bonding layers (third and fifth layers) in a multilayer pipe provide the connection between the polyethylene layer and the barrier layer and it is made of any known to experts adhesive materials, such as cyanoacrylate adhesives, methacrylate adhesives, epoxy adhesives or polyurethane adhesives. Methacrylate adhesives have proven to be beneficial for bonding pipe/tube layers. Preferably, the adhesive is a commercially available adhesive under the name MITSUI ADMER NF 498E.

For the purposes of this description, the term "tube" is to be understood as a packaging tube, a container, the body of which is made of a fragment of a pipe, where one end of the tube has been hot sealed to form the bottom of the packaging.

Cosmetic preparations that can be packed into tubes according to the invention are ointments, creams, pastes, liquids.

The polyethylene tube consists of a pipe consisting of six layers produced by a coextruding process involving the following steps:
  a) placing in externally heated dispensers supplying polymeric material to the extruder nozzles of thermoplastic polymers or barrier polymers or binding polymers, wherein in the first dispenser responsible for the formation of the inner layer (first layer) is filled with the thermoplastic material together with zinc oxide at a rate of between $5 \times 10^2$ and $1 \times 10^4$ ppm, the second dispenser is filled with thermoplastic polymer with recycled polyethylene regranulate (second layer), the third dispenser is filled with binding polymer (third layer), the fourth dispenser is filled with barrier polymer (fourth layer), the fifth dispenser is filled with binding polymer (fifth layer) and the sixth dispenser is filled with thermoplastic polymer (sixth layer), then
  b) the content of each dispenser is mixed and heated until thermoplastic polymers or barrier polymers or binding polymers are melted,
  c) the layers subsequently flow from the six-layer feed block to the extrusion nozzle and are formed into a six-layer pipe, which inner layer is a layer containing $5\times10^2$ to $1\times10^4$ ppm zinc oxide, the subsequent layer and the subsequent layers respectively are materials as described above, d) the pipe is then cooled and cut into pre-set lengths.

The multilayer pipe is formed by an inner layer—the first layer, which is polyethylene containing dispersed particles of zinc oxide in the amount of $5\times10^2$ to $1\times10^4$ ppm with a thickness of 10 to 50 µm, the next layer—the second layer, is a thermoplastic polymer layer with a regranulate with a thickness of 150 to 205 µm, the next—the third layer, a binding layer from 10 to 20 µm thick, a fourth layer is placed on it—a barrier layer of EVOH from 9 to 30 µm thick, followed by a fifth layer from 10 to 20 µm thick binding layer and an outer layer—a sixth layer, a thermoplastic polymer layer from 150 to 205 µm thick.

For example, for a pipe with a diameter of 35 mm, the wall thickness of the pipe is preferably 500 µm, wherein the first layer being 20-50 µm thick, the second layer 100-200 µm, the remaining layers totaling 250-380 µm.

Pipe fragments cut to size are welded on one side to form a closed tube body (packaging) on one side (bottom of tube). Next, the tube head is mounted to the open side of the tube opposite to the bottom of the tube. A piece of polyethylene, heated to approx. 250° C., is dosed into a die head in a closure application machine, after applying on a cylindrical part a stamp of a tube (casing/tube wall) it presses on a piece of raw material in the die. During this operation, the tube head is simultaneously formed and heat sealed to the tube wall.

A polyethylene tube with such a six-layer body made of pipe has the physical properties of plastic containers (flexibility and ability to return to its original shape), and by adding a barrier polymer EVOH becomes resistant to penetration into the product of undesirable substances and gases. The barrier layer protects the product against external factors such as UV rays, air, humidity, as well as against oxidation of the product or release of substances outside the container, such as fragrances.

Methodology for the Assessment of Surface Properties of Tubes:

Surface properties of samples are determined by measuring the Wet Tension (WT) of polyethylene or polypropylene films according to ASTM: D 2578-04 Standard Test Method for Wetting Tension of Polyethylene and Polypropylene Films. In this method, droplets of a series of formamide and 2-ethoxyethanol mixtures with progressively increasing surface tension are applied to the polyethylene or polypropylene film until the wetting tension of the surface is equivalent to its value of the reference solvent mixture used for pre-conditioned tests at 23±2° C. and 50±5% relative humidity for 40 hours. The measurement shall be of an indirect nature allowing the change in the hydrophobic nature of the surface to be assessed on the basis of the wettability of the test materials.

The research carried out with this method shows that the wetting tension of laminate surfaces according to the invention is lower for pipes/tubes doped with zinc oxide than for polyethylene surfaces without the addition of zinc oxide and falls within the range of 26-33 dyna/cm for tubes with ZnO (see example below).

The invention according to this description has the following advantages:
- the structure, quantity and choice of materials of the six-layer pipe layers ensures the flexible properties of the packaging tube,
- the barrier layer ensures the impermeability to air (oxygen) or moisture,
- the presence of zinc oxide in the inner layer of the pipe ensures anti-adhesive properties, as a result of which the preparation stored in the tube does not stick to the tube walls and is thus easily removed from the tube, As a result of the above advantages, the polyethylene tube is a unique product for the storage of cosmetics, because, among other things:
- ensures easy removal of the preparation from the packaging, which is connected with the economic aspect of the use of such packaging tubes; the preparation does not remain on the walls of the tube, so it can be fully used for the purpose for which it is intended, in addition, the non-stick additive in the form of ZnO does not significantly increase the cost of production of the tube because it is a component generally available commercially and relatively cheap,
- is safe for users: zinc oxide is not eluted in significant quantities from the inner layer of the tube to the preparation, and those quantities of ZnO that elude are not harmful for the user (ZnO is known as a beneficial active ingredient of ointments and creams); in addition, zinc oxide for the production of the tube is not used in the form of nanoparticles, which recently have not been popular as a health beneficial form,
- due to the presence of a barrier layer, the product can be safely and relatively long stored in the tube according to the invention (there is no deterioration of the product quality due to the limitation of air/oxygen and moisture penetration into the product and the active substances or additives from the product to the outside),
- provides other additional properties resulting from the addition of zinc oxide to the inner layer of the tube, e.g. antibacterial properties.

The subject matter of the invention is illustrated in FIG. 1, where:
- on the left is presented the tube according to the invention including the pipe and the head;
- on the right is presented magnified cross-section through the structure of layers (coating) of the pipe according to the invention.

The structure of layers is defined in the claims and description.

EXAMPLE 1

A multilayer pipe was made in accordance with the method described above. The structure of the layers forming the pipe coating has the following structure:
- first layer 1 (inner) of 20 µm thickness, in contact with the product inside the package, which is a combination of 80% LDPE polyethylene and 20% HDPE polyethylene, with the addition of dispersed ZnO particles in the amount of $3\times10^3$ ppm.
- second layer 2, which is a combination of 80% LDPE polyethylene and 20% HDPE polyethylene in the amount of 60%, with the addition of 40% recycled polyethylene granulate, with a thickness of 150 µm.
- third layer 3-binding, of MITSUI ADMER NF 498E adhesive with a thickness of 20 µm
- fourth layer 4-barrier layer, made of EVOH commercially available under the name MITSUI EVAL LCF101B with a thickness of 30 µm
- fifth layer 5-binding layer, of MITSUI ADMER NF 498E adhesive with a thickness of 20 µm
- sixth layer 6, which is a combination of 80% LDPE polyethylene and 20% HDPE polyethylene, with a thickness of 150 µm.

The cross-section of the pipe coating with the structure of layers according to the invention is presented on FIG. 1.

To obtain the pipe, commercially available LDPE and HDPE polymers were used, as well as commercially available ZnO powder.

According to the invention, the mass for preparing the first layer of pipe was made by mixing ZnO with a mixture of polyethylene as above. The mixture prepared this way was introduced directly into the extruder nozzle.

EXAMPLE 2

In order to confirm the hydrophobic properties of the pipe and multilayer tube with the first (inner) layer of 1 polyethylene doped with ZnO particles, the surface wetting voltage was measured for the inner layer of polyethylene enriched with ZnO. The pipe obtained in example 1 was used for the experiment.

The examination was carried out in accordance with the procedure of standard D 2578. In the test, a balm (a cosmetic product with a dynamic viscosity of 10 000 mPas) was used as a reference substance, which represents a typical product corresponding to the rheological properties of cosmetic market products to be stored in a tube according to the invention. The measurement principle was based on the evaluation of the time needed for the product to flow down a certain volume of the product by the determined length of the test sample, set at an appropriate slope. The results of the experiment unequivocally indicate that the migration time of a droplet of the standard substance placed on the tested materials (containing zinc oxide and reference material) is shorter for samples containing ZnO. The standard substance moved through this layer about 15-30% faster than the surface of the reference material without ZnO.

EXAMPLE 3

A polyethylene tube was made as a packaging for cosmetic preparations.

The cut off part of the multilayer pipe (20 cm) with the structure of layers as in the example 1 was hot sealed on one side, obtaining the bottom of the container (bottom of the tube). This fragment of the pipe, which was hot sealed on one side, forms the body of the packaging tube. The tube body prepared in this way slides onto a mandrel, on the free end of which the tube head is placed. A piece of polyethylene, heated to approx. 250° C., is dosed into the die in the closure application machine, after applying on a cylindrical part a stamp of a pipe (coating/tube wall) it presses on a piece of raw material in the die. During this operation, the tube head is simultaneously formed and heat sealed to the pipe wall.

The tube according to the invention is presented on FIG. 1.

The invention claimed is:

1. A multilayer pipe consisting of layers in a structure:
    a) first layer (1) consisting of LDPE polyethylene or a combination of 80% LDPE polyethylene and 20% HDPE polyethylene
    b) second layer (2), consisting of a combination of 50-70% LDPE polyethylene or a combination of 80% LDPE polyethylene and 20% HDPE polyethylene with addition of a recycled polyethylene granulate in the amount of 30-50%
    c) third layer (3), which is the binding layer
    d) fourth layer (4), which is a barrier layer of EVOH
    e) fifth layer (5), which is the binding layer
    f) sixth layer (6), which is LDPE polyethylene or a combination of 80% LDPE polyethylene and 20% HDPE polyethylene,
    characterized in that the first layer (1) consisting of LDPE polyethylene or a combination of 80% LDPE polyethylene and 20% HDPE polyethylene contains dispersed particles of zinc oxide in the amount from $5 \times 10^2$ to $1 \times 10^4$ ppm.

2. A multilayer pipe according to claim 1 characterized in that the binding layers are adhesives selected from the group: cyanoacrylate adhesives, methacrylate adhesives, epoxy adhesives or polyurethane adhesives.

3. A multilayer pipe according to claim 1 characterized in that the amount of dispersed particles of zinc oxide in the first layer (1) is $3 \times 10^3$ ppm.

4. A multilayer pipe according to claim 1 characterized in that the first layer (1) is 10-50 μm thick, the second layer (2) is 150-205 μm thick, the third layer (3) is 10-20 μm thick, the fourth layer (4) is 9-30 μm thick, the fifth layer (5) is 10-20 μm thick, the sixth layer (6) is 150-205 μm thick.

5. A polyethylene tube comprising a multilayer pipe according to claim 1, closed by hot sealing on one side to form the bottom of the tube and connected to the opposite side of the bottom of the tube by a threaded head, wherein the first layer (1) of the multilayer pipe, which is made of LDPE polyethylene or a combination of 80% LDPE polyethylene and 20% HDPE polyethylene, contains dispersed particles of zinc oxide in the amount of $5 \times 10^2$ to $1 \times 10^4$ ppm and is the inner layer of the tube that comes into contact with the product inside the container.

6. A polyethylene tube according to claim 5 characterized in that the multilayer pipe has a diameter of 35 mm and the thickness of its coating is 500 μm.

* * * * *